(12) United States Patent
Kikuchi et al.

(10) Patent No.: US 6,512,736 B2
(45) Date of Patent: Jan. 28, 2003

(54) DISK CARTRIDGE WITH SHUTTER SECTIONS AND SHUTTER COVER

(75) Inventors: Shuichi Kikuchi, Miyagi (JP); Rie Izu, Miyagi (JP)

(73) Assignee: Sony Corporation, Tokyo (JP)

( * ) Notice: Subject to any disclaimer, the term of this patent is extended or adjusted under 35 U.S.C. 154(b) by 17 days.

(21) Appl. No.: 09/772,030

(22) Filed: Jan. 29, 2001

(65) Prior Publication Data

US 2001/0010680 A1 Aug. 2, 2001

(30) Foreign Application Priority Data

Jan. 31, 2000 (JP) ........................................ 2000-027412

(51) Int. Cl.[7] ............................. G11B 3/70; G11B 5/84; G11B 7/26
(52) U.S. Cl. ...................................................... 369/291
(58) Field of Search ................................. 369/291, 272; 360/131, 133

(56) References Cited

U.S. PATENT DOCUMENTS 4,648,001 A * 3/1987 Komatsu .................... 360/133
5,917,685 A * 6/1999 Kikuchi et al. ............. 360/133

* cited by examiner

*Primary Examiner*—Robert S. Tupper
*Assistant Examiner*—Julie Anne Watko
(74) *Attorney, Agent, or Firm*—Frommer Lawrence & Haug LLP; William S. Frommer

(57) ABSTRACT

A disc cartridge can effectively prevent dirt particles from entering the cartridge main body and improve the reliability of the operation of signal recording/reproduction on the disc-shaped recording medium. The disc cartridge comprises a cartridge main body 6 and a shutter member 35 having an upper shutter section 41 and a lower shutter section 42 adapted to openably close the recording/reproduction opening 17 and the drive opening 18 arranged outside the cartridge main body 6. A shutter cover 50 is arranged on the main surface of the cartridge main body 6 to cover the area of displacement of the lower shutter section 42. The shutter cover 50 is provided with an opening 51 slightly smaller than the lower shutter section 42 of the shutter member 35 at a position corresponding to the recording/reproduction opening 17 and the drive opening 18.

15 Claims, 13 Drawing Sheets

DISK CARTRIDGE WITH SHUTTER SECTIONS AND SHUTTER COVER

BACKGROUND OF THE INVENTION

1. Technical Field of the Invention

This invention relates to a disk cartridge containing a disk-shaped recording medium such as an optical disk or a magneto-optical disk.

2. Related Background Art

Disk cartridges containing a disk-shaped recording medium such as a magneto-optical disk are known.

Referring to FIG. 1 of the accompanying drawings, disk cartridge 101 of the type under consideration comprises a cartridge main body 106 having an upper shell 111 and a lower shell 112, which upper and lower shells 111, 112 are typically made of a resin material. The cartridge main body 106 is provided with substantially rectangular openings 115, 115 that are arranged oppositely and across the inner and outer peripheries of the magneto-optical disk 105 so as to expose part of the recording area of the magneto-optical disk 105 to the outside for the purpose of signal recording/reproduction.

The cartridge main body 106 is additionally provided at the bottom side thereof with another opening 117 for allowing the disk table of the disk drive mechanism (not shown) for driving and rotating the magneto-optical disk 105 to move into the cartridge main body 106, said opening 117 for driving the magneto-optical disk (to be referred to as drive opening 117 hereinafter) being located adjacent to the bottom side opening 115 for recording/reproduction (to be referred to as recording/reproduction opening 115 hereinafter) with a frame section (not shown) arranged between them.

Referring also to FIG. 1, the cartridge main body 106 is provided with a movable shutter member 120 adapted to openably close the recording/reproduction openings 115, 115 and the drive opening 117. Referring now to FIG. 2 of the accompanying drawings, the shutter member 120 comprises an upper shutter section 121 for openably closing the recording/reproduction opening 115 of the upper shell 111, a lower shutter section 122 for openably closing the recording/reproduction opening 115 of the lower shell 112 and a link section 123 coupling the upper shutter section 121 and the lower shutter section 122 at an edge thereof. The lower shutter section 122 of the shutter member 120 is movably supported at the free end thereof by a guide section arranged on the main surface of the lower shell 112.

As the disk cartridge 101 having the above described configuration is mounted on a corresponding recording/reproduction apparatus, the shutter member 120 is moved to expose the recording/reproduction openings 115, 115 and the drive opening 117 by the shutter opening/closing member of the recording/reproduction apparatus. Then, the disk table of the disk drive mechanism (not shown) of the recording/reproduction apparatus is made to move into the disk cartridge 101 through the drive opening 117 in order to drive the magneto-optical disk 105 to rotate, while the recording/reproduction means of the recording/reproduction apparatus is made to move into the disk cartridge 101 through the recording/reproduction openings 115, 115 in order to record information onto or reproduce information from the magneto-optical disk 105.

In recent years, as a result of the remarkable increase in the amount of information to be handled on a magneto-optical disk cartridge, there is a large demand for magneto-optical disks having a large recording capacity. To meet the demand, efforts have been made to raise the recording density of the recording area of the recording medium and, at the same time, extend the recording area toward the outer and inner peripheries thereof. As an attempt for extending the recording area, there have been proposed disk cartridges 101 wherein the lower recording/reproduction opening and the drive opening are not separated from but held in continuation to each other in order to allow the recording/reproduction means of the recording/reproduction apparatus to move inwardly beyond the inner boundary of the recording area of the magneto-optical disk.

However, such disk cartridges have the following drawbacks. Firstly, since the disk cartridge 101 has the lower recording/reproduction opening 115 and the drive opening 117 in continuation to each other and the lower shell 112 of the cartridge main body 106 does not have a frame section located at the middle of the lower shutter section 122 for openably closing the lower recording/reproduction opening 115 and the drive opening 117 in order to separate the openings 115, 117 and hold them in position, the relatively elongated recording/reproduction openings 117, 117 can easily become deformed.

Secondly, since the lower shell of the cartridge main body is normally prepared by injection molding a thermoplastic synthetic resin material, the bottom surface of the cartridge main body can be warped downwardly or upwardly as shown in FIG. 3A or FIG. 3B, whichever appropriate.

As a result of the warp of the lower shutter section 122 and the deformation of the lower shell caused by the molding process, a gap can arise between the lower shutter section and the lower shell if the lower shutter section is at the position for closing the lower recording/reproduction opening and the drive opening to allow dirt particles to enter the cartridge main body.

In the case of a disk cartridge containing a magneto-optical disk adapted to high density recording, the dirt particles that have entered the cartridge main body can adhere to the recording area of the magneto-optical disk or move further into the recording/reproduction apparatus to hinder the normal recording/reproduction process on the magneto-optical disk.

BRIEF SUMMARY OF THE INVENTION

In view of the above identified problems and other problems, it is therefore the object of the present invention to provide a disk cartridge that can effectively prevent dirt particles from entering the cartridge main body and improve the reliability of the operation of signal recording/reproduction on the disk-shaped recording medium.

According to the invention, the above object is achieved by providing a disk cartridge comprising:

a disk-shaped recording medium;

a cartridge main body containing said disk-shaped recording medium;

recording/reproduction openings formed in said cartridge main body to partly expose said disk-shaped recording medium to the outside across the inner and outer peripheries thereof;

a drive opening adapted to allow the disk drive means for driving and rotating said disk-shaped recording medium to move into said cartridge main body;

a shutter member having shutter sections and arranged outside said cartridge main body to openably close said recording/reproduction openings and said drive opening; and a shutter cover arranged at least on one of the main surfaces of said cartridge main body to cover the moving areas of said shutter sections and having an opening slightly smaller than either of the shutter sections of said shutter member, said opening being arranged at a position corresponding to said recording/reproduction openings and said drive opening.

With a disk cartridge according to the invention and having a configuration as described above, the moving areas of the shutter sections of the shutter member are covered by the shutter cover so that any possible warp of the shutter sections along the main surfaces is suppressed by the shutter cover and dirt particles are prevented from entering the cartridge main body through the gap between the outer peripheral areas of the shutter sections and the cartridge main body when the recording/reproduction openings and the drive opening are closed by the shutter sections. When the shutter members are removed from the recording/reproduction openings and the drive opening to expose the openings, the recording/reproduction means of the recording/reproduction apparatus can enter the cartridge main body through the opening of the shutter cover.

Thus, with a disk cartridge having a shutter cover according to the invention, dirt particles are prevented from entering the cartridge main body through the gap between the outer peripheral areas of the shutter sections and the cartridge main body when the recording/reproduction openings and the drive opening are closed by the shutter sections so that the operation of recording information on or reproducing information from the disk-shaped recording medium can be conducted with an enhanced reliability.

DETAILED DESCRIPTION OF THE INVENTION

Now, the present invention will be described in greater detail by referring to the accompanying drawing that illustrates preferred embodiments of disk cartridge according to the invention. Firstly, referring to FIGS. 4 and 5, the disk cartridge 1 comprises a magneto-optical disk 5 and a cartridge main body 6 rotatably containing the magneto-optical disk 5. As shown in FIG. 6, the magneto-optical disk 5 is disk-shaped and provided with a center hole 10.

Figure 6:
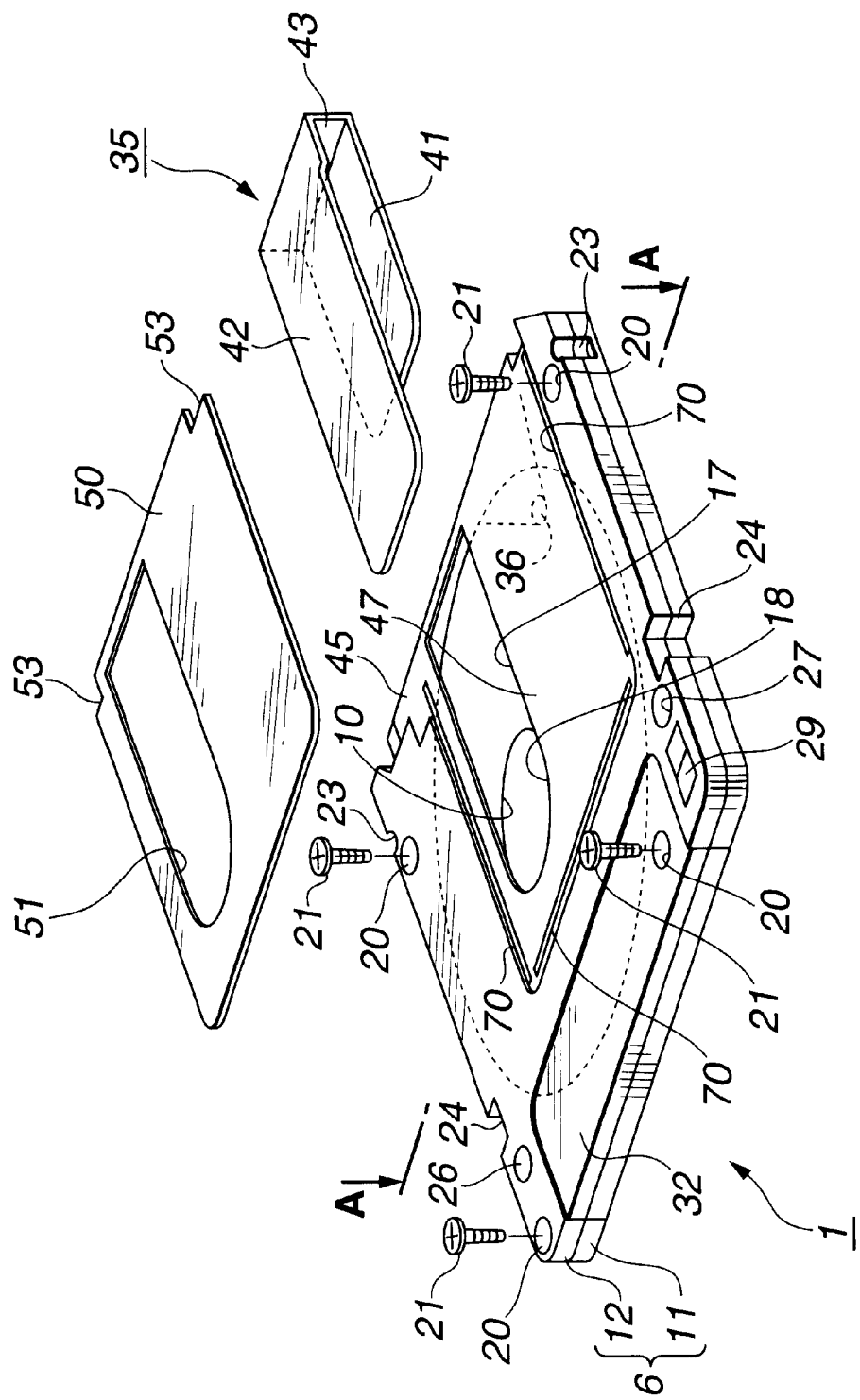
FIG. 6 is an exploded schematic perspective view of the embodiment of disk cartridge of FIG. 4 as viewed from the bottom side thereof.
Figure 7:
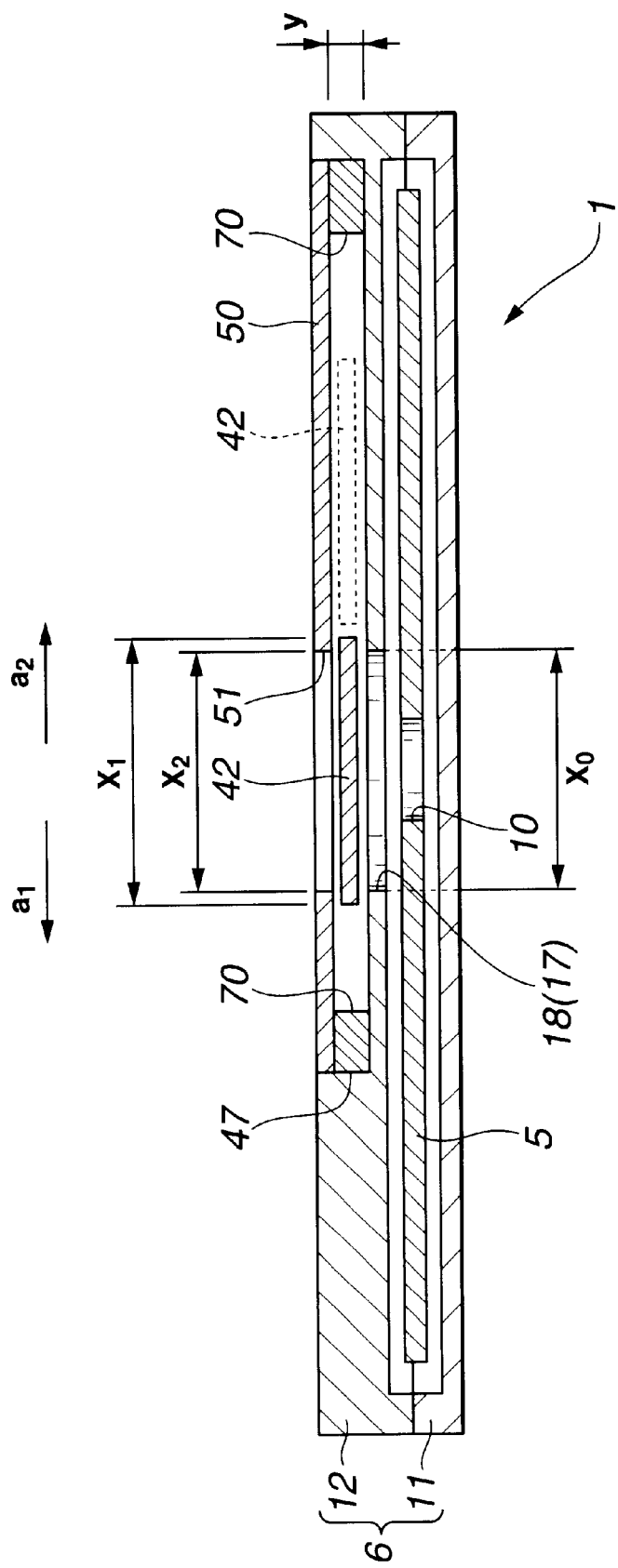
FIG. 7 is a schematic cross sectional view of the embodiment of disk cartridge of FIG. 4 taken along line A—A in FIG. 5.

As shown in FIGS. 6 and 7, the cartridge main body 6 is formed by an upper shell 11 and a lower shell 12 that are combined to form a unit. The upper shell 11 and the lower shell 12 have a substantially box-like profile and are typically made of a thermoplastic synthetic resin material.

Figure 1:
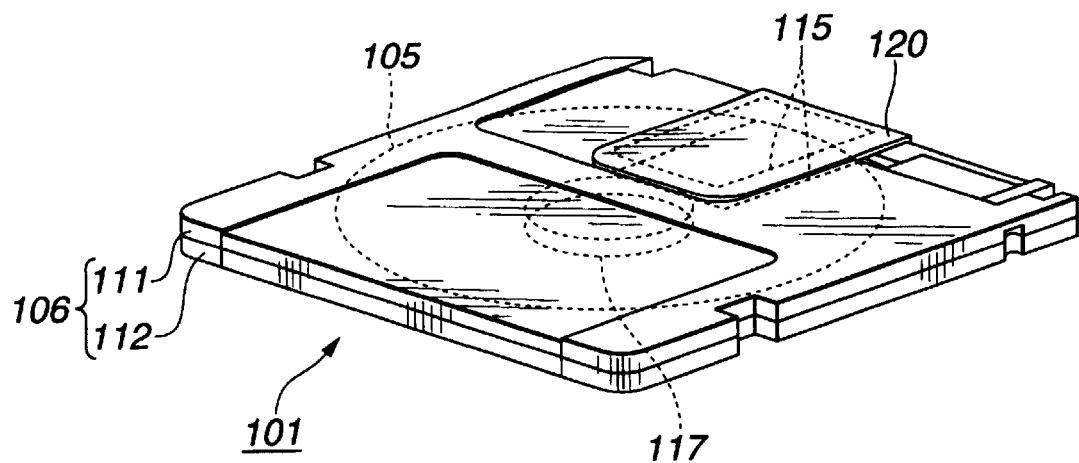
FIG. 1 is a schematic perspective view of a known disk cartridge.
Figure 2:
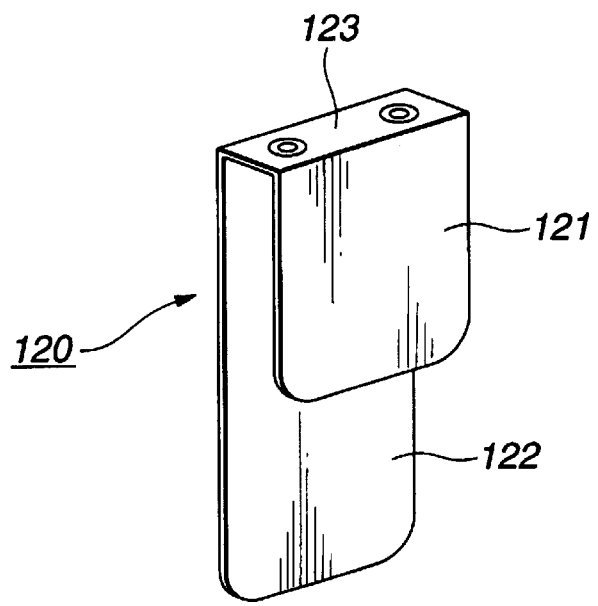
FIG. 2 is a schematic perspective view of the shutter member of the known disk cartridge of FIG. 1.
Figure 3A:
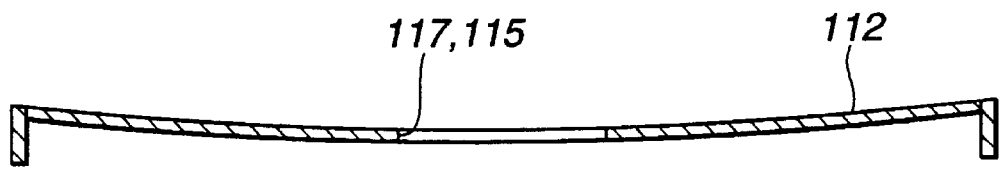
FIGS. 3A–3B is schematic cross sectional views of the lower shell of the cartridge main body of the known disk cartridge of FIG. 1.
Figure 3B:
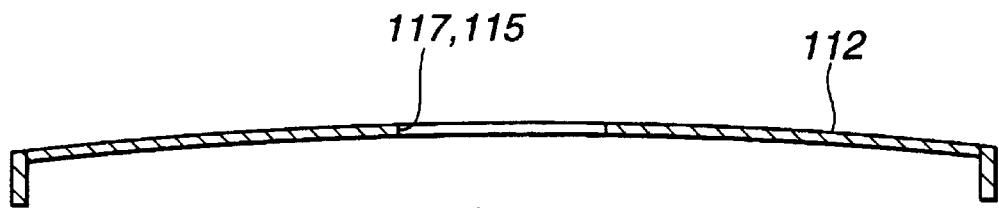
Figure 4:
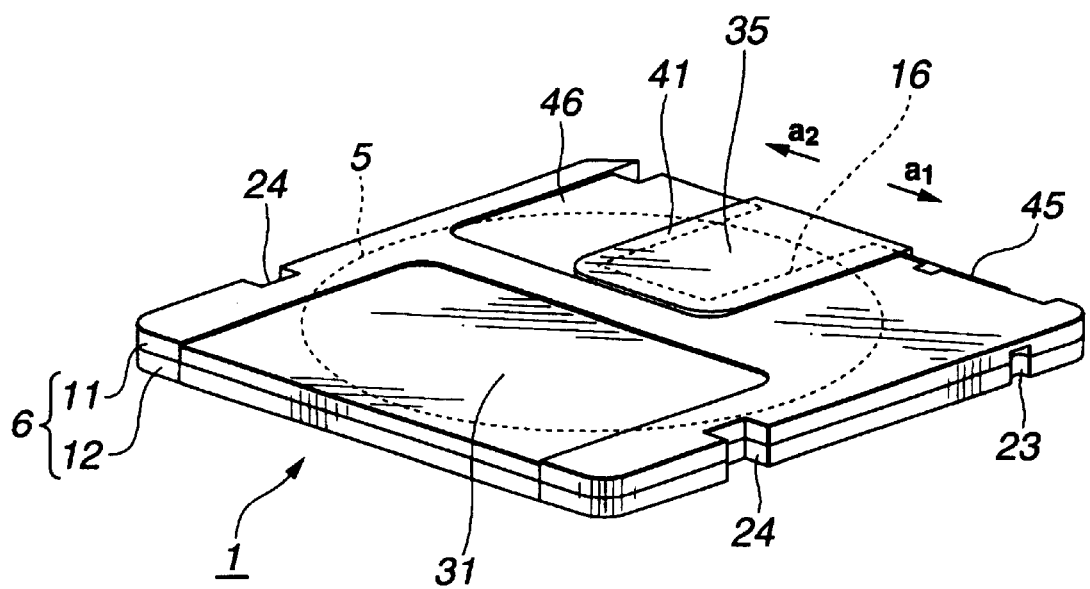
FIG. 4 is a schematic perspective view of an embodiment of disk cartridge according to the invention.

As shown in FIG. 4, the upper shell is provided with a substantially rectangular recording/reproduction opening 16 for exposing the magneto-optical disk 5 to the magnetic head (not shown) of the corresponding recording/reproduction apparatus. On the other hand, as shown in FIG. 6, the lower shell 12 is also provided with a substantially rectangular recording/reproduction opening 17 for exposing the magneto-optical disk 5 to the optical pickup (not shown) of the recording/reproduction apparatus and additionally with a substantially circular drive opening 18 for allowing the disk table (not shown) of the disk drive mechanism of the recording/reproduction apparatus to enter the disk cartridge.

Both the upper shell 11 and the lower shell 12 are provided in the inside thereof with respective circular disk receiving sections (not shown) for receiving the magneto-optical disk 5.

Both the upper shell 11 and the lower shell 12 are additionally provided at positions located near the corners on the bottom side thereof with coupling screw holes 20, 20, 20, 20. Thus, as coupling screws 21, 21, 21, 21 are driving into the screw holes 20, 20, 20, 20, the upper shell 11 and the lower shell 12 are bound together to form a unit.

Figure 5:
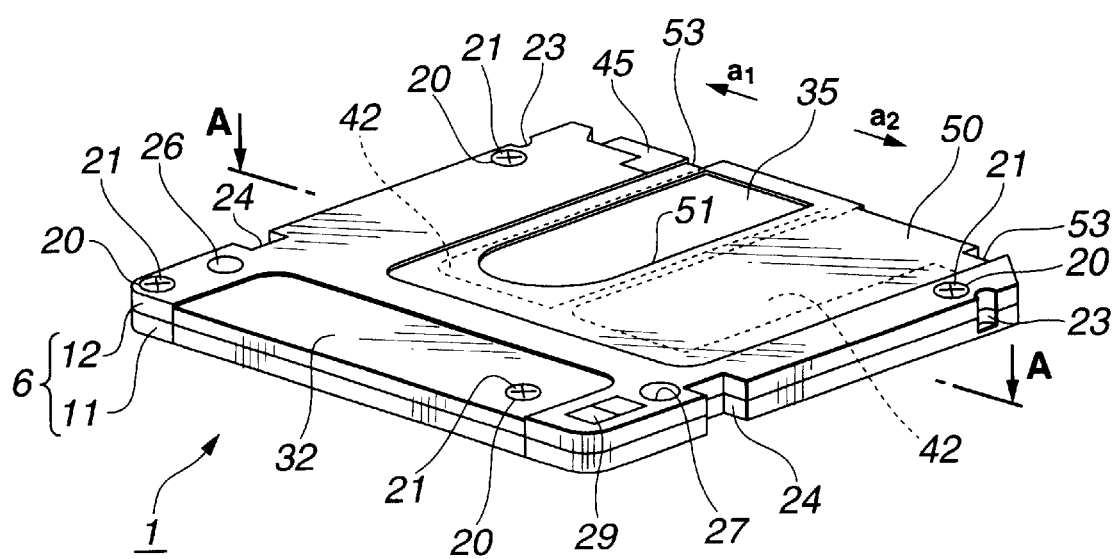
FIG. 5 is a schematic perspective view of the embodiment of disk cartridge of FIG. 4 as viewed from the bottom side thereof.

As shown in FIGS. 4 and 5, the cartridge main body 6 is provided at positions located close to the rear edge thereof with a pair of engaging grooves 24, 24 to be engaged with respective engaging arms for drawing the disk cartridge toward the cartridge receiving section of the recording/reproduction apparatus, the engaging grooves running in the direction perpendicular to the direction along which the disk cartridge is moved into and away from the recording/reproduction apparatus. Referring to FIGS. 5 and 6, the cartridge main body 6 is provided at the bottom side thereof with alignment notches 23, 23 and alignment holes 26, 27 for placing the disk cartridge in position in the cartridge receiving section of the recording/reproduction apparatus.

Also referring to FIGS. 5 and 6, the cartridge main body 6 is also provided at the bottom side thereof with a misrecording prevention member 29 for preventing any erroneous recording operation form taking place on the magneto-optical disk 5.

Referring to FIGS. 4 and 5, the upper shell 11 and the lower shell 12 of the cartridge main body 6 are provided on the main surfaces thereof with respective label areas 31, 32 so that a label 30 may be applied thereto across the rear edge of the cartridge main body 6 as viewed from the recording/reproduction apparatus in order to carry indexes for the pieces of information recorded on the magneto-optical disk 5.

As shown in FIGS. 4, 5 and 6, the cartridge main body 6 is further provided with a shutter member 35 movable in the directions of arrow $a_1$ and arrow $a_2$ for openably closing the recording/reproduction openings 16, 17 and the drive opening 18 and a torsion coil spring 36 urging the shutter member 35 toward the position for closing the recording/reproduction openings 16, 17 and the drive opening 18.

Referring to FIG. 6, the shutter member 35 is made of a relatively rigid metal material such as aluminum and has an upper shutter section 41, a lower shutter section 42, said upper shutter section 41 and said lower shutter section 42 being arranged vis-a-vis outside the cartridge main body 6, and a link section 43 linking the upper shutter section 41 and the lower shutter section 42 along an edge thereof. Thus, the shutter member 35 shows a substantially U-shaped cross section.

As seen from FIG. 6, the upper shutter section 41 has an area slightly greater than the area of the recording/reproduction opening 16 of the upper shell 11 so that it can completely close the recording/reproduction opening 16, while the lower shutter section 42 is elongated relative to the upper shutter section 41 and has an area slightly greater than the area of the recording/reproduction opening 17 plus that of the drive opening 18 of the lower shell 12 so that it can completely close the recording/reproduction opening 17 and the drive opening 18.

Therefore, as shown in FIG. 7, both the upper shutter section 41 and the lower shutter section 42 have a width $x_1$ greater than the width $x_0$ of the recording/reproduction openings 16, 17 and the drive opening 18 as viewed in the moving directions of the upper shutter section 41 and the lower shutter section 42.

As shown in FIGS. 4 and 5, the link section 43 of the shutter member 35 is provided with a slide member 45 to be engaged with the shutter operating member (not shown) of the recording/reproduction apparatus. The slide member 45 is movable in the directions of arrow $a_1$ and $a_2$ relative to the cartridge main body 6.

The slide member 45 is arranged inside the shutter member 35 as integral part thereof and the torsion coil spring 36 is hooked at an end thereof to a corresponding end of the slid member 45. The torsion coil spring 36 is arranged inside the cartridge main body 6 and hooked at the other end thereof to the inside of the cartridge main body 6.

As shown in FIGS. 4, 5 and 6, the upper shell 11 and the lower shell 12 are provided on the main surfaces thereof with respective substantially rectangular shutter moving recesses 46, 47, which are located at respective positions close to the front end of the disk cartridge as viewed from the recording/reproduction apparatus receiving the disk cartridge to respectively make the upper shutter section 41 and the lower shutter section 42 of the shutter member 35 movable. The shutter moving recesses 46, 47 have respective areas greater than the corresponding areas of displacement of the upper and lower shutter sections 41, 42 of the shutter member 35 when the latter are moved to openably close the recording/reproduction openings 16, 17 and the drive opening 18 and a depth slightly greater than the height of the upper and lower shutter sections 41, 42. Thus, upper shutter section 41 and the lower shutter section 42 would not pop up from the corresponding main surfaces of the upper shell 11 and the lower shell 12 when they are moved in the respective shutter moving recesses 46, 47.

As shown in FIGS. 5 and 6, the shutter moving recess 47 of the cartridge main body 6 is provided with a shutter cover 50 that is substantially flush with the main surface of the lower shell 12 and adapted to cover the area of displacement of the lower shutter section 42 of the shutter member 35. In other words, the depth of the shutter moving recess 47 is greater than the sum of the height of the lower shutter section 42 and that of the shutter cover 50 as seen from FIG. 7.

As shown in FIGS. 5, 6 and 7, the shutter cover 50 is a flat and panel-shaped member having a substantially rectangular contour and made of a resin material such as polycarbonate or a metal material such as stainless steel or aluminum. It has a height about 0.2 mm to 0.5 mm.

As shown in FIGS. 6 and 7, the shutter cover 50 is provided on the main surface thereof with an opening 51 located at a position corresponding to the recording/reproduction opening 17 and the drive opening 18 of the lower shell 12. The area of the opening 51 is slightly greater than the sum of the area of the recording/reproduction opening 17 and that of the drive opening 18 but slightly smaller than that of the lower shutter section 42. Thus, the opening 51 has a width x2 slightly smaller than the width x1 of the lower shutter section 42 as shown in FIG. 7.

As shown in FIGS. 6 and 7, the shutter cover 50 is provided at the front corners thereof with notches 53, 53 that allow the shutter operating member (not shown) of the recording/reproduction apparatus to become engaged with the shutter member 35.

As the shutter cover 50 having the above described configuration is arranged on the cartridge main body 6, it can correct or suppress the warp that can occur to the surfaces of the shell 12 when the latter is molded due to its bridging reinforcement effect to secure the flatness of the bottom of the cartridge main body 6. Therefore, the disk cartridge 1 can reliably move into and out of the recording/reproduction apparatus through the cartridge insertion port of the latter.

Figure 8:
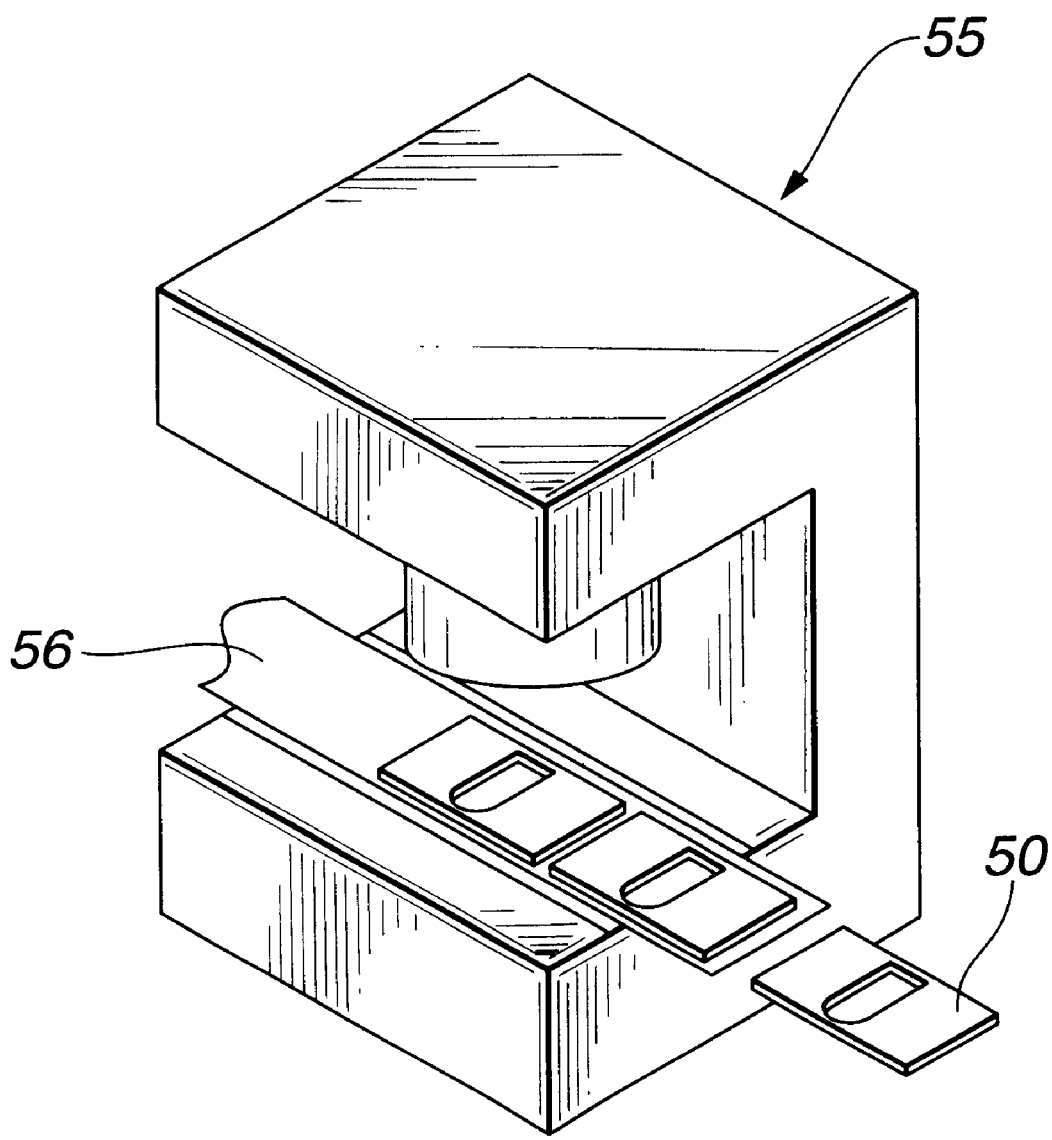
FIG. 8 is a schematic perspective view of a cutting machine for cutting out a shutter cover from a mint sheet of the material of shutter cover.

As illustrated in FIG. 8, the above described shutter cover 50 can be prepared without difficulty by punching out from a mint sheet 56 of the material of the shutter cover by means of a cutting machine 55 so as to make it show a desired profile.

Figure 9:
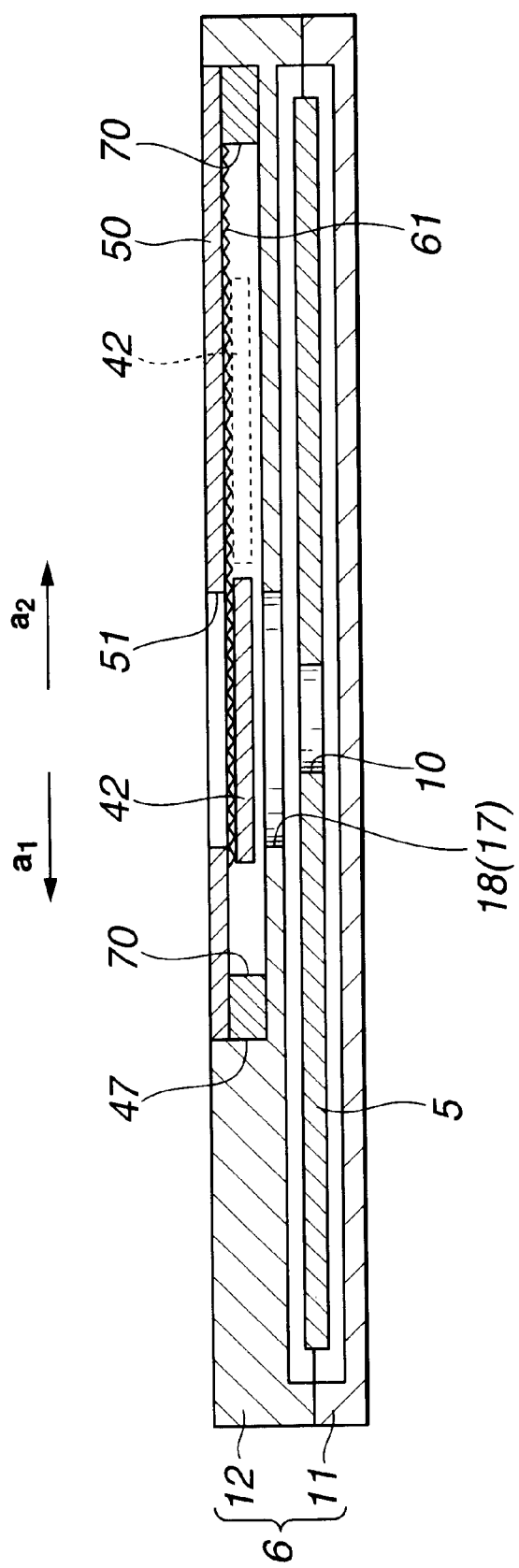
FIG. 9 is a schematic cross sectional view of the embodiment of disk cartridge of FIG. 4 taken along line A—A in FIG. 5 and illustrating the coarse surface of the shutter cover.
Figure 10:
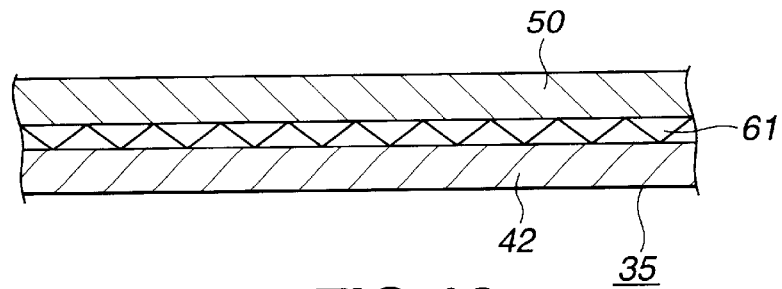
FIG. 10 is a schematic longitudinal cross sectional partial view of the embodiment of disk cartridge of FIG. 4, illustrating a principal portion of the coarse surface of the shutter cover.

As shown in FIGS. 9 and 10, the shutter cover 50 may be provided on the surface thereof facing the lower shutter section 42 with a coarse surface 61 that makes the lower shutter section 42 easily slidable. The coarse surface 61 reduces the sliding resistance of the shutter cover 50 relative to the lower shutter section 42 of the shutter member 35 to allow the shutter member 35 to move smoothly.

The coarse surface 61 of the shutter cover 50 can be produced without difficulty by providing the roller to be used in the rolling process for regulating the thickness of the shutter cover 50 cut out from the mint sheet 56 with a corresponding coarse surface so that the latter coarse surface may be transferred to the former coarse surface 61. Alternatively, the coarse surface 61 may be produced by way of a surface polishing process such as a so-called hair line finishing process or by way of a blasting process.

Although not shown, the shutter cover 50 may additionally be provided on the inner surface thereof with a lubricant coating layer that also makes the shutter member 35 highly slidable.

Such a coating layer may be formed typically by applying an ink prepared by mixing base resin ink of a thermosetting material such as polyurethane resin with a lubricant such as polyethylene type wax or dimethylsilicon that is added by about 3 to 10% and diluting the mixture with a solvent such as methylethylketone to the surface of the mint sheet 56 by means of a rolling type coater to a thickness of several to 20 $\mu$m and then drying the applied ink by hot air so that the shutter cover 50 having a coarse surface 61 can be produced when it is punched out from the mint sheet 56 to show a desired profile.

While the base resin is thermosetting in the above description, the thermosetting material may be replaced by an ultraviolet-ray-setting type material such as acryl resin. If such is the case, the resin is applied to the surface of the mint sheet 56 and ultraviolet rays are irradiated to the coating layer to make it set. One or more than one coloring agents may be added to the material of the coating layer for the purpose of decorating the shutter cover 50.

The material of the shutter cover 50 is not limited to a resin material such as polycarbonate. Materials that can be used for the shutter cover 50 include synthetic resin materials such as polystyrene, acryl, acrylbutylstyrol, high impact styrol and polypropylene and metal materials such as aluminum and stainless steel because any of these materials can provide the shutter cover 50 with a satisfactory level of surface smoothness. Alumilite (tradename) produced by anodic oxidation of aluminum may also be suitably used for the shutter cover.

Preferably, both the coarse surface 61 and the coating layer show an arithmetic mean surface coarseness Ra as defined by formula below along the surface facing the lower shutter section 42.

$$0.3 \ \mu m \leq Ra \leq 2.0 \ \mu m$$

If the arithmetic mean surface coarseness Ra is less than 0.3 $\mu$m, the shutter cover 50 does not show any improved sliding effect. On the other hand, if the arithmetic mean surface coarseness Ra exceeds 2.0 $\mu\mu$m, the shutter cover 50 can be caught by the lateral edges of the lower shutter section 42 of the shutter member 35 when it is made to slide so that no smooth sliding motion can be realized for the shutter cover 50. Therefore, it is preferable that both the coarse surface 61 and the coating layer show an arithmetic mean surface coarseness Ra as defined by the above formula.

Figure 11:
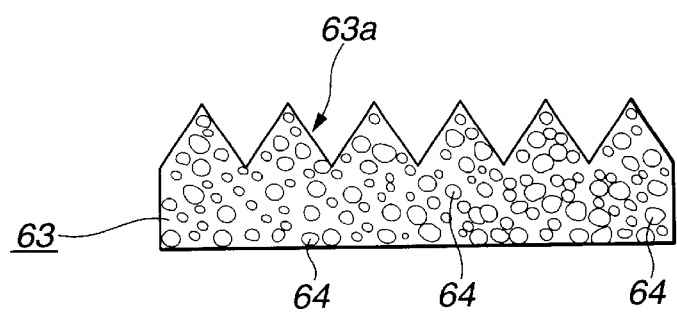
FIG. 11 is a schematic longitudinal cross sectional partial view of the shutter cover of the embodiment of FIG. 4, illustrating the coating layer thereof.

Alternatively, as shown in FIG. 11, the coating layer 63 may be formed by applying ink of a synthetic resin material prepared by mixing base resin ink with particles 64 having an average particle diameter between several and 15 $\mu$m. As ink containing particles with the above average particle diameter is applied, hard and undeformable projections 63a can be formed along the surface of the coating layer 63 to reduce the sliding resistance of the coating layer 63 of the shutter cover 50 relative to the lower shutter section 42 and ensure a smooth motion on the part of the lower shutter section 42. The coating layer 63 can improve the wear-resistance of the shutter cover 50 so that the shutter member 35 can maintain its operational reliability for a prolonged period of time.

The material of the coating layer 63 can be prepared by adding particles of one or more than one organic materials selected from acryl, polystyrene, methylpolymethacrylate, urethane, nylon, polytetrafluoroethylne, etc. or one or more than one inorganic materials selected from titanium oxide, calcium carbonate, barium sulfate, alumina, aluminum borite, zinc oxide, silicon dioxide, ceramic, glass, etc to base resin ink of polyurethane resin or the like.

If the average particle diameter of the particles 64 added to the base resin ink is too small, the projections 63a along the surface can be easily deformed. If, on the other hand, the average particle diameter of the particles 64 is too large, the adhesive force of the added particles 64 relative to the shutter cover 50 is reduced unless the coating layer 63 is made relatively thick to consequently adversely affect the wear-resistance. The net result will be a raised cost of application of the coating layer 63 and a reduced overall productivity. Therefore, the size of the particles 64 added to the coating layer 63 is found within the above range, more preferably between several and ten $\mu$m.

Figure 12:
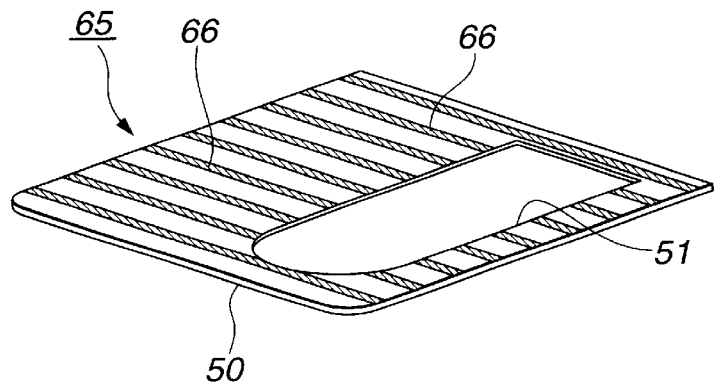
FIG. 12 is a schematic perspective view of the shutter cover of the embodiment of FIG. 4, illustrating an alternative coating layer.
Figure 13:
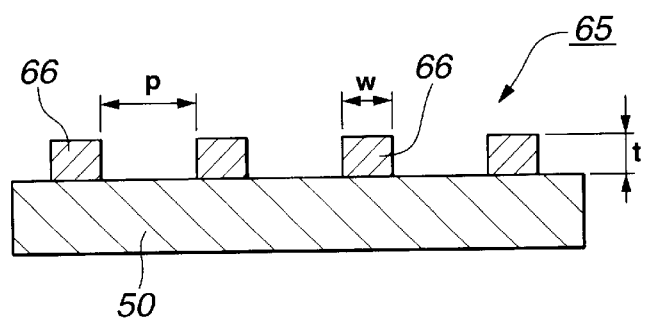
FIG. 13 is an enlarged schematic longitudinal cross sectional partial view of the shutter cover of the embodiment of FIG. 4, illustrating a principal portion of the coating layer thereof.

As shown in FIGS. 12 and 13, the coating layer 65 may carry a plurality of linear sliding stripes 66 that are running substantially in parallel with the directions of movement of the lower shutter section 42 of the shutter member 35. As shown in FIG. 13, the sliding stripes 66 are made to have predetermined values in terms of the gaps p separating them, the width w and the height t. Specifically, the sliding stripes 66 preferably have a thickness t between several and 20 $\mu$m. If the thickness of the sliding stripes 66 is less than several $\mu$m, the sliding stripes 66 can be worn out after a relatively small number of sliding motions. If, on the other hand, the thickness of the sliding stripes 66 exceeds 20 $\mu$m, it is difficult to apply a coating material to it and, if the coating layer 65 lacks sufficient coagulating force, the projecting sections of the sliding stripes 66 can become removed after a relatively small number of sliding motions.

The sliding stripes 66 preferably have a width w not less than 0.2 mm. If the sliding stripes 66 are too narrow, they can be worn out after a relatively small number of sliding motions. While the upper limit of the width w of the sliding stripes 66 is defined as a function of the thickness t thereof and also dependent on the operating conditions to some extent, it is preferably about 5 mm. Like the width w, the intervals p separating the sliding stripes are also defined as a function of the thickness t of the stripes.

After forming the coating layer 65 of a pattern of a plurality of sliding stripes 66 by applying ink by means of printing technique using a rolling type coater, the ink is dried by using an appropriate technique. With such a coating layer 65, the sliding stripes 66 operate as sliding guide for the lower shutter section 42 so as to ensure a smooth and reliable motion on the part of the shutter member 35.

Although not shown, the shutter cover 50 may be provided with an additional antistatic coating layer containing an antistatic agent and formed on both the inner and outer surfaces thereof in order to reduce the frictional charge of the shutter cover 50 that arises as a result of a sliding motion of the shutter cover 50 relative to the shutter member 35 and prevent particles of dirt from adhering to the shutter cover 50 and the shutter member 35. Then, the particles of dirt that otherwise adhere to them are prevented from entering into the cartridge main body 6 and further into the recording/reproduction apparatus. The shutter cover 50 is effectively prevented from being electrically charged by printing it with ink containing one or more than one electrically conductive materials such as carbon black and/or zinc oxide.

In an experiment, after adding electrically conductive carbon black powder to ink by about 2% and mixing them well, the obtained ink is applied to the shutter cover 50 to a thickness of about 10 μm and dried. Then, a voltage of 8.5 kv is applied to the prepared shutter cover 50 for 60 seconds by corona discharge and the antistatic effect of the shutter cover was observed and compared with a shutter cover without such an antistatic treatment. The time required for the shutter cover 50 carrying an antistatic coating layer to reduce the electric charge by half, or the so-called half life of the electric charge, was about 30 seconds, whereas the corresponding time of the shutter cover 50 without any antistatic treatment was 180 seconds. Thus, it was proved that the use of a coating layer containing an antistatic agent can remarkably improve the antistatic effect of the shutter cover 50. While the use of an anionic or cationic surface active agent or a polymeric material showing polarity in place of an antistatic agent provides a similar effect, the antistatic effect obtained by using such an agent is less durable than the use of an antistatic agent in ink.

While the coarse surface 61 and the coating layers 63, 65, 66 are formed on the surface of the shutter cover 50 that faces the lower shutter section 42 in the above description, if necessary, any of them may also be formed on the surface of the lower shutter section 50 that faces the shutter cover 42.

Figure 14:
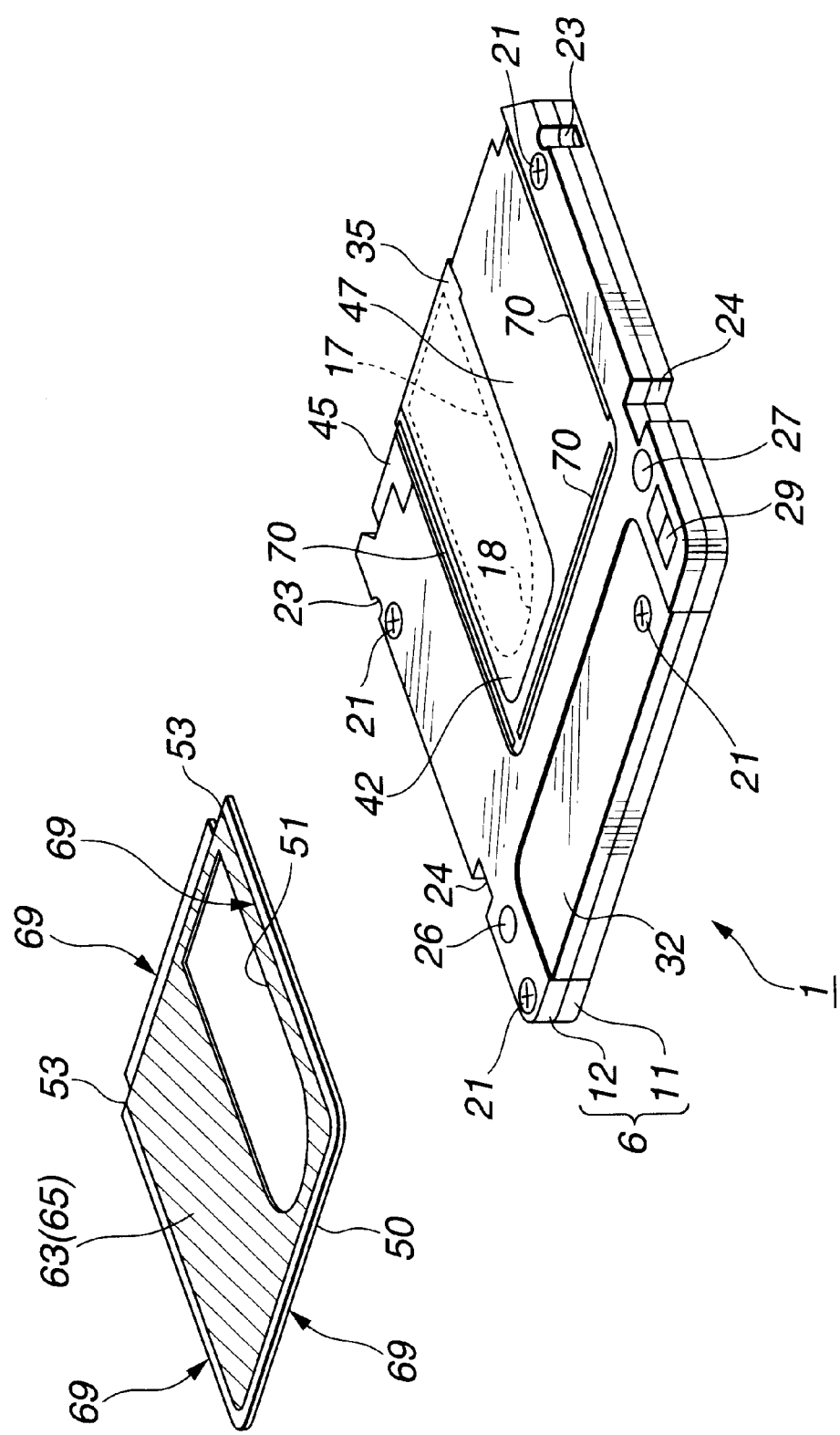
FIG. 14 is an exploded schematic perspective view of the embodiment of disk cartridge of FIG. 4, illustrating the bonding margin of the shutter cover thereof.
Figure 15:
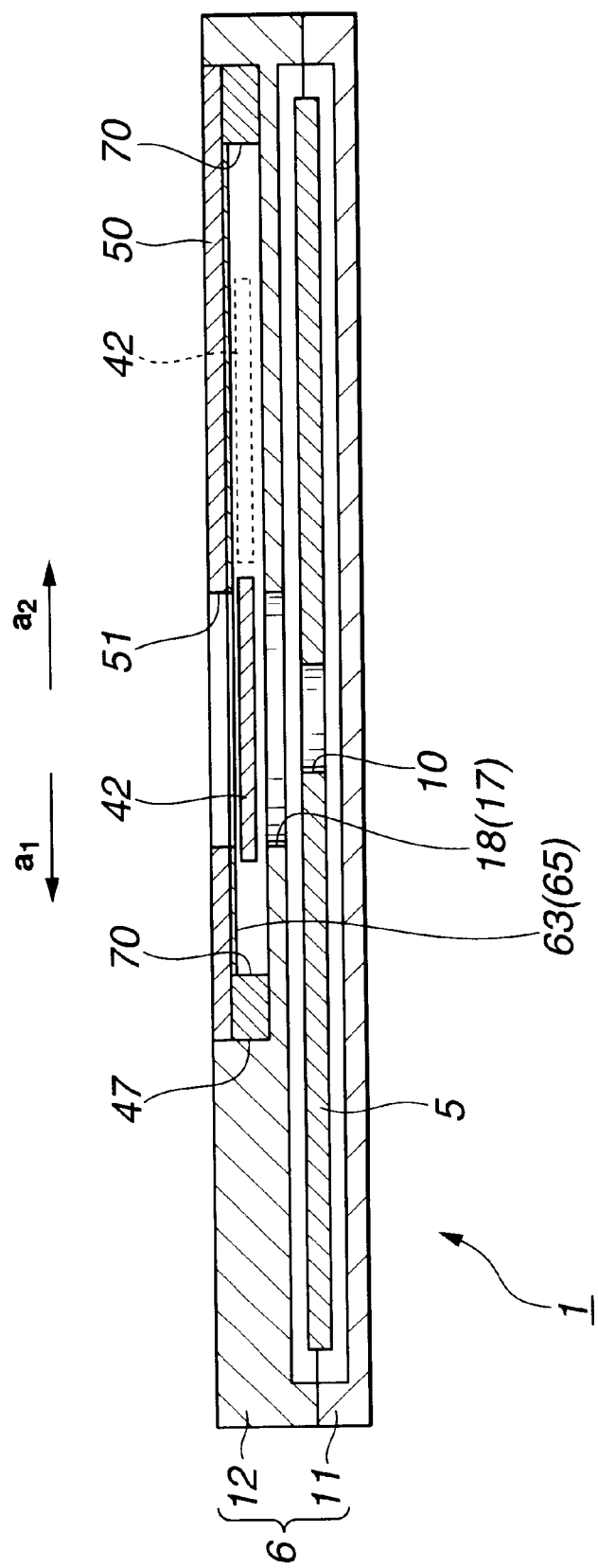
FIG. 15 is a schematic longitudinal cross sectional view of the embodiment of disk cartridge of FIG. 4, illustrating the shutter cover bonded to the cartridge main body.

As shown in FIGS. 14 and 15, the shutter cover 50 is provided along the outer periphery thereof and on the surface facing the lower shutter section 42 with a bonding margin 69 that does not bear any coarse surface 61 nor coating layers 63, 65, 66 so that the shutter cover 50 may be securely bonded to the inside of the shutter moving recess 47 of the lower shell by using the bonding margin 69. Thus, the shutter cover 50 can be reliably secured to the predetermined position in the shutter moving recess 47 of the lower shell by applying the adhesive to the bonding margin 69 of the shutter cover 50 and bonding it to the shutter moving recess 47.

Figure 16:
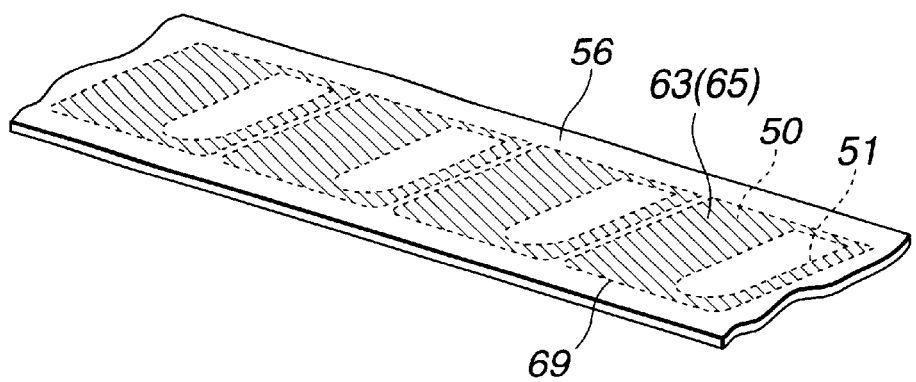
FIG. 16 is a schematic perspective view of a sheet of the material of shutter cover, illustrating how shutter covers are cut out.

As shown in FIG. 16, the shutter cover 50 can easily be prepared by forming a coating layer of predetermined pattern in the area inside the bonding margin 69 typically by means of a rolling type coater, gravure coating or screen printing and cutting out the shutter cover 50 typically by means of a cutting machine 55 in a manner as described earlier.

Then, the prepared shutter cover 50 is bonded to the shutter moving recess 47 of the lower shell 12 typically by means of an adhesive tape 70 bearing an adhesive layer on the two opposite sides thereof or an adhesive agent applied to the bonding margin 69 with the coarse surface 61 and the coating layers 63, 65, 66 facing the lower shutter section 42. If an adhesive tape 70 is used, it is made to have to predetermined thickness y in order to provide a predetermined gap between the shutter cover 50 and the bottom surface of the shutter moving recess 47 so that the lower shutter section 42 may become movable there.

Now, the operation of the shutter member 35 for opening and closing the recording/reproduction openings 16, 17 and the drive opening 18 of the disk cartridge 1 will be discussed below.

As shown in FIGS. 4, 5 and 7, the shutter member 35 of the disk cartridge 1 is urged in the direction of arrow $a_1$ by the torsion coil spring 36 to hold the recording/reproduction openings 16, 17 and the drive opening 18 to a closed state.

Since the outer periphery of the lower shutter section 42 of the disk cartridge 1 is covered by the shutter cover 50 and not exposed to the outside when the recording/reproduction openings 16, 17 and the drive opening 18 are closed by the shutter member 35, any dirt is prevented from entering the disk cartridge 1 by way of the outer periphery of the lower shutter section 42.

Then, as the disk cartridge 1 is placed in position in the cartridge receiving section of the recording/reproduction apparatus as shown in FIG. 7, the shutter member 35 is moved in the direction of arrow $a_2$ by the shutter operating member of the recording/reproduction apparatus against the urging force of the torsion coil spring 36 to open the recording/reproduction openings 16, 17 and the drive opening 18.

As the recording/reproduction openings 16, 17 and the drive opening 18 of the disk cartridge 1 are opened by the movement of the shutter member, the lower shutter section 42 is moved to the storage position where it is covered by the shutter cover 50 as shown in FIGS. 5 and 7.

Then, the disk table of the disk drive mechanism of the recording/reproduction apparatus enters through the drive opening 18 into the disk cartridge 1 whose shutter member 35 is now moved to the storage position to drive the magneto-optical disk 5 to rotate, while the magnetic field applying head and the optical pickup enters into the disk cartridge 1 through the respective recording/reproduction openings 16, 17 to start the operation of recording information on or reproducing information from the magneto-optical disk 5.

As described earlier, as the area of displacement of the lower shutter section 42 of the shutter member 35 of the disk cartridge 1 is covered by the shutter cover 50, the lower shutter section 42 is relieved of being warped along the surface thereof and dirt is prevented from entering the cartridge main body 6 through the gap between the lower shutter section 42 and the lower shell 12. Therefore, the embodiment of disk cartridge 1 can effectively protect the magneto-optical disk 5 against dirt and improve the reliability of its operation of signal recording/reproduction.

Additionally, due to the fact that the shutter cover 50 is so arranged that it covers the outer periphery of the lower shutter section 42 when the opening 51 of the shutter cover 50 is moved to a position where the recording/reproduction openings 16, 17 and the drive opening 18 are closed by the shutter member 35, the cartridge main body 6 is further protected against possible invasion of dirt.

Now, another embodiment of disk cartridge according to the invention will be described also by referring to the accompanying drawing. Note that the components of this embodiment of disk cartridge that are same as or similar to those of the above described embodiment are denoted respectively by the same reference symbols and will not be described any further.

Figure 17:
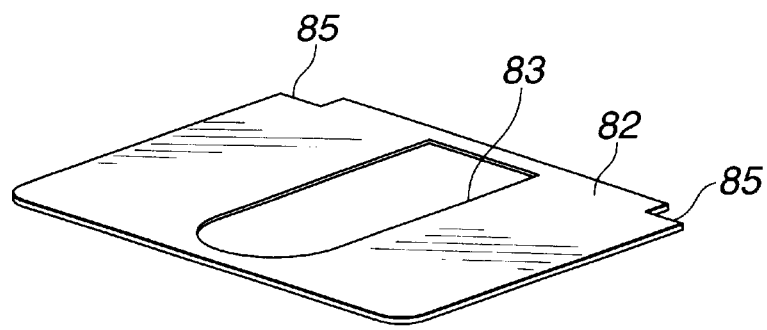
FIG. 17 is an exploded schematic perspective view of another embodiment of disk cartridge according to the invention and having a different shutter cover.
Figure 17:
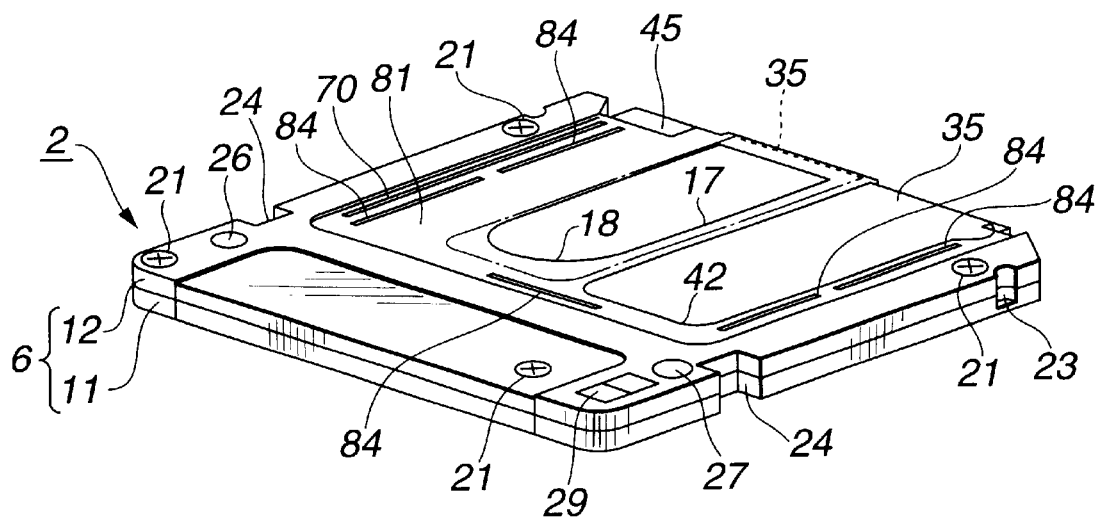
Figure 18:
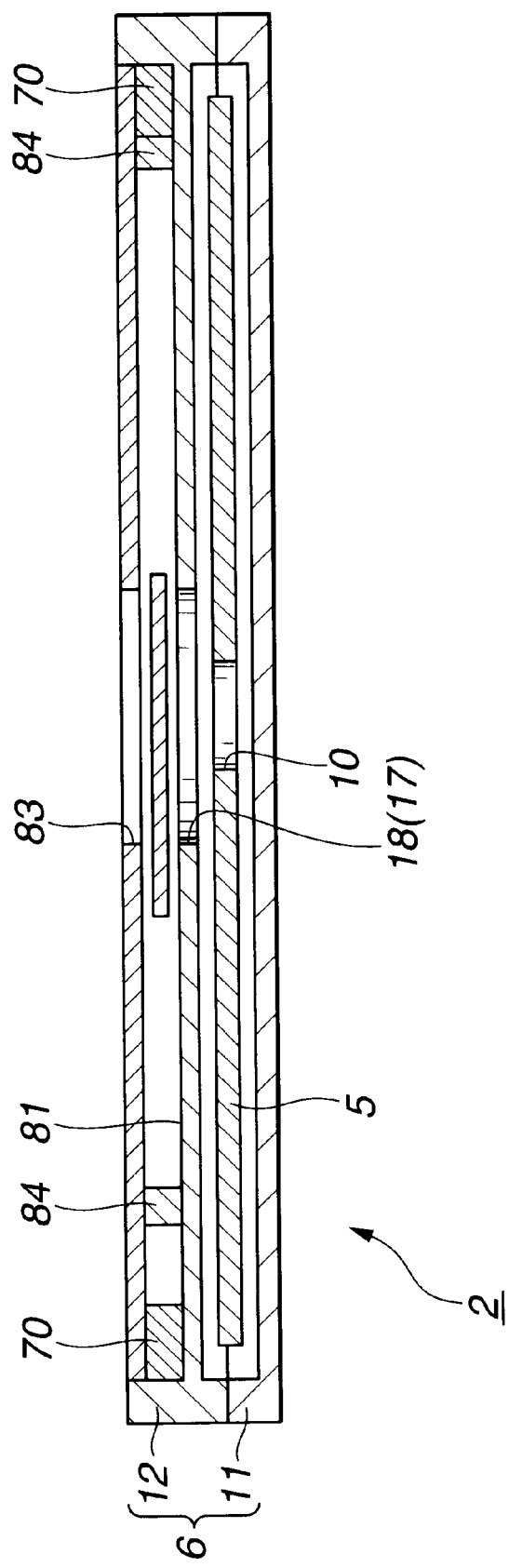
FIG. 18 is a schematic longitudinal cross sectional view of the embodiment of disk cartridge of FIG. 17.

Referring to FIGS. 17 and 18, the other embodiment of disk cartridge 2 is provided with a shutter moving recess 81 having an area greater than the area of displacement of the shutter member 35 and extending transversely relative to the cartridge main body 6. The shutter moving recess 81 is provided with a shutter cover 82 covering the area of displacement of the lower shutter section 42. As seen from FIGS. 17 and 18, the main surface of the shutter cover 82 is provided with an opening 83 slightly smaller than the lower shutter section 42 of the shutter member 35. The shutter cover 82 is additionally provided at the front end corners whereof as viewed from the cartridge main body 6 with respective notches 85, 85 for exposing the shutter member 35 to the shutter operating member of the recording/reproduction apparatus.

Also as shown in FIGS. 17 and 18, the shutter moving recess 81 of the disk cartridge 2 is provided on the bottom surface thereof with support projections 84, 84 adapted to abut the shutter cover 82 at positions close to the outer periphery of the latter and outside the area of displacement of the shutter member 35 in order to securely provide a predetermined gap between the inner surface of the shutter cover 82 and the bottom surface of the shutter moving recess 81. While the support projections 84, 84 are arranged linearly along the outer periphery of the shutter moving recess 81 in FIGS. 17 and 18, each of them may be replaced by a plurality of cylindrical support pins.

As shown in FIG. 18, a sufficient gap is securely provided between the inner surface of the shutter cover 82 and the bottom surface of the shutter moving recess 81 as the support projections 84, 84 abuts the inner surface of the shutter cover 82 when the latter is placed in position in the shutter moving recess 81 so that the lower shutter section 42 of the shutter member 35 can smoothly move within the disk cartridge 2.

As described above, the shutter cover 82 having a surface area greater than the area of displacement of the shutter member 35 is arranged in the disk cartridge 2 so as to extend transversely relative to the cartridge main body 6 in the direction perpendicular to the direction in which the disk cartridge 2 is moved into or out of the recording/reproduction apparatus. With this arrangement, the warp, if any, of the lower shell 12 that can arise during the molding process can be corrected to make the bottom of the cartridge main body 6 satisfactorily flat. Therefore, the disk cartridge 2 is prevented from colliding with the edge of the cartridge insertion port of the recording/reproduction apparatus and can be smoothly moved into or out of the recording/reproduction apparatus through the cartridge insertion port.

While the shutter covers 50, 82 of the above described disk cartridges 1 and 2 are so designed as to cover only the lower shutter section 42 that is located at the side of the easily deformable lower shell 12, the upper shutter section 41 may also be provided with a shutter cover if necessary.

Now, still another embodiment of disk cartridge according to the invention will be described by referring to FIG. 19. In this embodiment, both the upper and lower shells are provided with respective shutter covers. Note that the components of this embodiment of disk cartridge that are same as or similar to those of the above described disk cartridges 1 and 2 are denoted respectively by the same reference symbols and will not be described any further.

Figure 19:
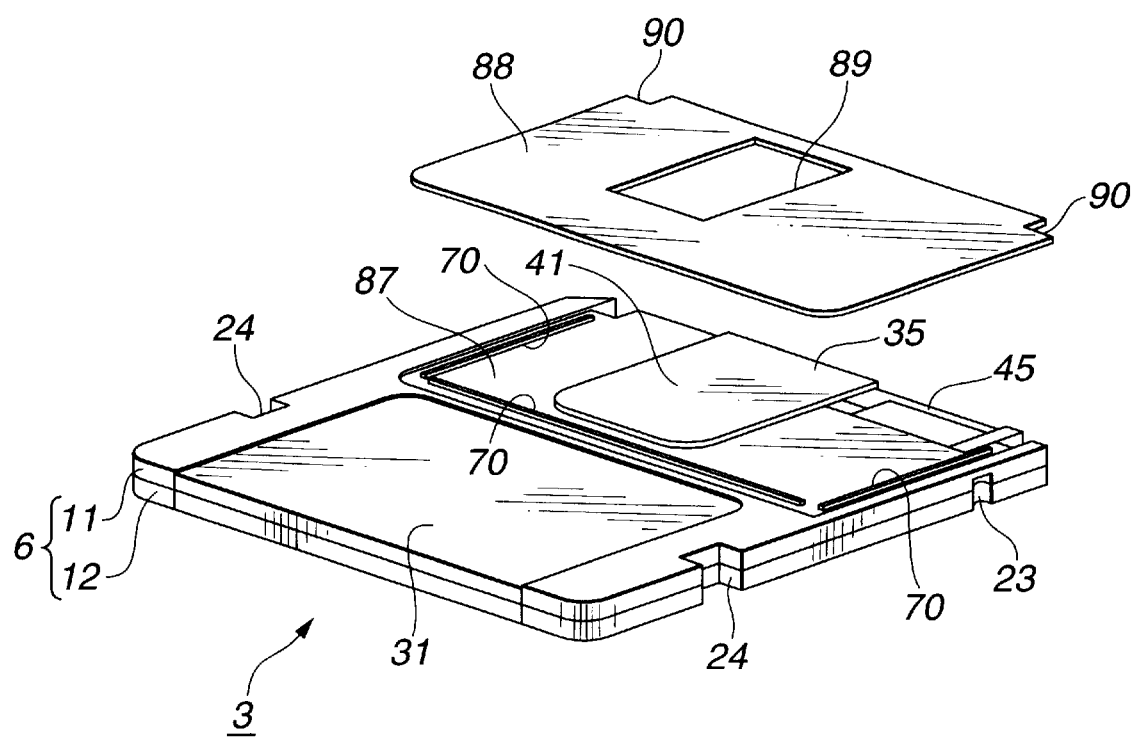
FIG. 19 is an exploded schematic perspective view of still another embodiment of disk cartridge of FIG. 17.

Referring to FIG. 19, the upper shell 11 of this disk cartridge is provided with a shutter moving recess 87 having an area greater than the area of displacement of the upper shutter section 41 of the shutter member 35 and extending transversely relative to the cartridge main body 6. Then, the shutter moving recess 87 is provided with a shutter cover 88 covering the area of displacement of the upper shutter section 41. As shown in FIG. 19, the shutter cover 88 is provided with an opening 89 having an area slightly smaller than the upper shutter section 41 of the shutter member 35. The shutter cover 88 is provided at the front end corners thereof with notches 90, 90 for exposing the shutter member 35 to the shutter operating member of the recording/reproduction apparatus.

Thus, the disk cartridge 3 having the above described configuration can better prevent dirt from entering the cartridge main body 6 to improve the reliability of the signal recording/reproducing operation because both the upper shutter section 41 and the lower shutter section 42 of the shutter member 35 are covered by the respective shutter covers 50, 88.

What is claimed is:

1. A disk cartridge comprising:

a disk-shaped recording medium;

a cartridge main body containing said disk-shaped recording medium;

recording/reproduction openings formed in said cartridge main body to partly expose said disk-shaped recording medium to the outside across the inner and outer peripheries thereof;

a drive opening adapted to allow the disk drive means for driving and rotating said disk-shaped recording medium to move into said cartridge main body;

a shutter member having shutter sections and arranged outside said cartridge main body to openably close said recording/reproduction openings and said drive opening; and a shutter cover arranged at least on one of the main surfaces of said cartridge main body to cover moving areas of said shutter sections and having an opening slightly smaller than either of the shutter sections of said shutter member, said opening being arranged at a position corresponding to said recording/reproduction openings and said drive opening.

2. The disk cartridge according to claim 1, wherein said cartridge main body is provided with a pair of recording/reproduction openings at respective positions located vis-a-vis;

said shutter member has a pair of said shutter sections to expose a pair of said recording/reproduction openings; and the cartridge main body is provided with a pair of oppositely disposed shutter covers.

3. The disc cartridge according to claim 1, wherein a first of said shutter sections of said shutter member is adapted to be stored between said shutter cover and said cartridge main body when moved to the position for opening said recording/reproduction openings and said drive opening.

4. The disc cartridge according to claim 1, wherein said opening of said shutter cover is adapted to cover the entire outer periphery of said shutter section of said shutter member when said shutter sections of said shutter member are moved to the respective positions for closing said recording/reproduction openings and said drive opening.

5. The disc cartridge according to claim 1, wherein said shutter cover is arranged transversally relative to said cartridge main body and substantially in parallel with the direction of movement of said shutter member.

6. The disc cartridge according to claim 1, wherein said cartridge main body is provided with a shutter moving recess for allowing the corresponding shutter section of said shutter member to move therein; and said shutter moving recess has an area slightly greater than the corresponding area of displacement of said shutter section that arises when said shutter section is moved for openably closing said openings and has a depth greater than the thickness of the shutter section.

7. The disc cartridge according to claim 6, wherein one or more than one gap securing members for securing a gap sufficient for allowing said shutter section to move are arranged between the inner surface of the shutter cover and the bottom surface of the shutter moving recess.

8. The disc cartridge according to claim 1, wherein said shutter cover is provided on the inner surface thereof facing the corresponding shutter section of said shutter member with a coarse surface for making the shutter section satisfactorily slidable.

9. The disc cartridge according to claim 8, wherein said coarse surface has an arithmetic mean coarseness Ra relative to the corresponding shutter section of said shutter member as defined by formula $0.3\ m \leq Ra \leq 2.0\ m$.

10. The disc cartridge according to claim 1, wherein said shutter cover is provided on the inner surface thereof facing the corresponding shutter section of said shutter member with a lubricative coating layer for making the shutter section satisfactorily slidable.

11. The disc cartridge according to claim 10, wherein said coating layer is formed by applying ink mixed with particles having an average particle diameter between 3 and 30 $\mu$m.

12. The disc cartridge according to claim 10, wherein said coating layer is realized in the form of a plurality of stripes arranged in parallel with the direction of movement of the corresponding shutter section of said shutter member.

13. The disc cartridge according to claim 10, wherein a coarse surface of said coating layer is formed on the inner surface of said shutter cover in the area thereof excluding a bonding area for bonding said shutter cover to said cartridge main body.

14. The disc cartridge according to claim 10, wherein said coating layer has an arithmetic mean coarseness Ra relative to the corresponding shutter section of said shutter member as defined by formula $0.3\ \mu m \leq Ra \leq 2.0\ \mu m$.

15. The disc cartridge according to claim 1, wherein said shutter cover is provided on the outer surface and/or the inner surface thereof with an antistatic layer.

* * * * *